United States Patent
Allouche et al.

(10) Patent No.: US 12,318,817 B2
(45) Date of Patent: Jun. 3, 2025

(54) ROBOTIC TROLLY FOR MOVING A CLEANING ROBOT AND A SYSTEM THAT INCLUDES A CLEANING ROBOT AND THE ROBOTIC TROLLY

(71) Applicant: Airtouch Solar Ltd., Tel Aviv (IL)

(72) Inventors: Yanir Allouche, Tel Aviv (IL); Yoav Anglisher, Tel Aviv (IL); Yair Bareket, Tel Aviv (IL)

(73) Assignee: Airtouch Solar Ltd., Tel Aviv (IL)

( * ) Notice: Subject to any disclaimer, the term of this patent is extended or adjusted under 35 U.S.C. 154(b) by 432 days.

(21) Appl. No.: 17/759,032

(22) PCT Filed: Jan. 17, 2021

(86) PCT No.: PCT/IB2021/050323
§ 371 (c)(1),
(2) Date: Jul. 18, 2022

(87) PCT Pub. No.: WO2021/144767
PCT Pub. Date: Jul. 22, 2021

(65) Prior Publication Data
US 2023/0042233 A1    Feb. 9, 2023

Related U.S. Application Data

(60) Provisional application No. 62/961,730, filed on Jan. 16, 2020.

(51) Int. Cl.
*B08B 1/30*    (2024.01)
*B08B 13/00*   (2006.01)
(Continued)

(52) U.S. Cl.
CPC ............. *B08B 1/30* (2024.01); *B08B 13/00* (2013.01); *B25J 9/1684* (2013.01); *B25J 13/081* (2013.01);
(Continued)

(58) Field of Classification Search
CPC ....................................................... B08B 1/30
See application file for complete search history.

(56) References Cited

U.S. PATENT DOCUMENTS 8,771,432 B2    7/2014  Meller et al.
9,991,841 B2    6/2018  Castellucci et al.
(Continued)

FOREIGN PATENT DOCUMENTS

CN    106391627 A    2/2017
KR    101988029 B1   9/2019

*Primary Examiner* — Jason Y Ko
(74) *Attorney, Agent, or Firm* — Reches Patents

(57) ABSTRACT

A robotic system for providing a surface cleaning device to a solar panel device, the robotic system may include (a) a drive unit that is configured to move the robotic system in relation to the solar panel device; (b) a support unit that comprises guiding elements, the guiding elements are configured to support the surface cleaning device; wherein the guiding elements comprise a first guiding element and a second guiding element; (c) an alignment unit that is configured to align, during an alignment process, the first guiding element and the second guiding element with the solar panel device; (d) sensing units that comprises a first sensing unit and a second sensing unit; wherein the first sensing unit is configured to sense a first spatial relationship between the first guiding element and a first portion of the solar panel device; wherein the second sensing unit is configured to sense a spatial relationship.

24 Claims, 16 Drawing Sheets

(51) Int. Cl.
*B25J 9/16* (2006.01)
*B25J 13/08* (2006.01)
*F24S 40/20* (2018.01)
*H02S 40/10* (2014.01)
*B25J 5/00* (2006.01)

(52) U.S. Cl.
CPC ............ *B25J 13/086* (2013.01); *F24S 40/20* (2018.05); *H02S 40/10* (2014.12); *B25J 5/005* (2013.01)

(56) References Cited

U.S. PATENT DOCUMENTS

| | | |
|---|---|---|
| 2017/0194898 A1 | 7/2017 | Meller et al. |
| 2021/0356973 A1 | 11/2021 | Xu et al. |

ROBOTIC TROLLY FOR MOVING A CLEANING ROBOT AND A SYSTEM THAT INCLUDES A CLEANING ROBOT AND THE ROBOTIC TROLLY

CROSS REFERENCE

This application claims priority from U.S. provisional patent 62/961,730 filing date Jan. 16, 2020 which is incorporated herein by reference.

FIELD OF THE INVENTION

At least one embodiment illustrated in the application relates to the field of a robotic system for supporting and providing surface cleaning devices to solar panel devices. The solar panel devices may be fixed solar panel devices or movable solar panel devices. Movable solar panel devices may be tracker type solar panel devices.

BACKGROUND OF THE INVENTION

Tracker type solar panel devices may include one or more solar panels that may be moved—for example in order to follow the sun—thereby increasing the efficiency of power generation. A solar panel device may include one or more row of solar panels.

A solar panel device may be referred to as a solar panel device. A solar panel device may include one or more solar panels arranged over one or more rows. For example between 5 to 200 rows, while each row may include 200-20 of solar panels. Other number of rows may be provided, other number of solar panels per row may be provided.

A solar farm (also referred to as a solar field or a solar park) may include multiple solar panel devices. The multiple solar panel devices may be arranged in various manners—for example in multiple columns.

It is highly inefficient to allocate a dedicated surface cleaning device per a solar panel device—especially when there are many solar panel devices.

Each solar panel has an external surface that is usually at least partially transparent and allows radiation to pass through and impinge on solar cells of the solar panel. This surface is usually the upper surface of the solar panel.

It may be beneficial to clean the dust that is aggregated on the external surface of solar panels of the solar panel devices when the external surface is dry—and not when it is humid.

This may require cleaning the external surface during the day—and when the solar panel device is a tracker type solar panel device—this may require cleaning the external surface while the tracker type solar panel device is in a certain (usually unknown) tilt angle—that may vary along the day and/or based on one or more other parameters.

Furthermore—the multiple solar panel devices may be positioned on sand or otherwise movable and/or deformable terrain that may change over time (for example—due to weather conditions, impact of the weight of the multiple solar panel devices on the terrain, and the like)—which may change the spatial relationship between the solar panel devices and their vicinity.

There is a growing need to allocate a surface cleaning device to more than a single solar panel device and to provide the surface cleaning device to a solar panel device in an accurate and safe manner.

SUMMARY

There may be provided one or more robotic systems, one or more combinations of one or more robotic systems and one or more surface cleaning device, a control system, a method for cleaning one or more solar panel, devices, and the like.

BRIEF DESCRIPTION OF THE DRAWINGS

In the drawings:
FIG. 16 illustrated examples of methods.

DETAILED DESCRIPTION OF EMBODIMENTS

Figure 1:
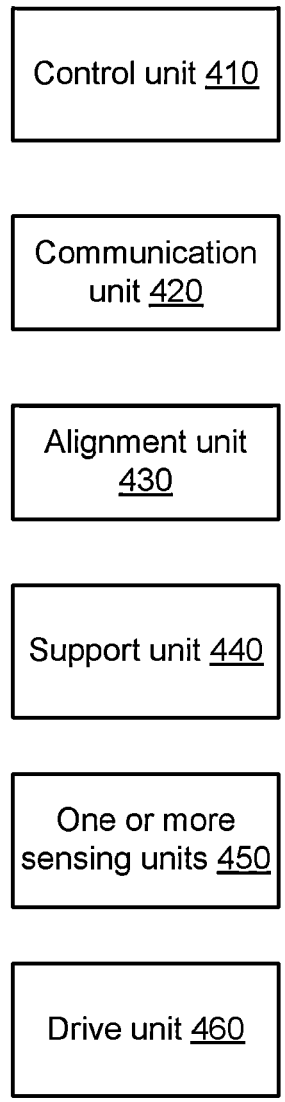
FIG. 1 illustrates examples of a robotic system.

Any reference to a provision of a surface cleaning device to a solar panel device (also referred to as docking) should be applied mutatis mutandis, to the receiving of the surface cleaning device from the solar panel device (also referred to as dislodging).

Any reference to a robotic system should be applied mutatis mutandis to a method executable by the robotic system.

Any reference to a robotic system should be applied mutatis mutandis to a non-transitory computer readable medium that stores instructions executable by the robotic system.

Any reference to a control system should be applied mutatis mutandis to a method executable by the control system.

Any reference to a control system should be applied mutatis mutandis to a non-transitory computer readable medium that stores instructions executable by the control system.

Any numeral number is an example—for example the number of sensing unit may differ (be smaller than or may exceed) than four, the number of guiding elements may be one or exceed two, and the like.

Any reference to a motor should be applied mutatis mutandis to a combination of a motor and any mechanical elements required to transfer or convert a movement of the motor to a required movement.

There is provided a robotic system that is configured to provide a surface cleaning device to a solar panel device. The surface cleaning device may be a cleaning robot. Non-limiting example of a surface cleaning device are illustrated in PCT application PCT/IL2017/050762 publication WO 2018/008033 and in PCT application PCT/IB2019/050946 publication WO 2019/155375, both are incorporated herein by reference.

The robotic system may take into account the spatial relationship between the robotic system and the solar panel device and may provide the surface cleaning device to the solar panel device in a safe manner.

The robotic system may be configured to measure the spatial relationship during (at least) an alignment process and may allow the surface cleaning device to propagate towards the solar panel device after the alignment succeeds.

The robotic system may be configured to measure the spatial relationship in a robust manner—for example by using analog sensors that are not visual sensors—that may operate even in low visibility conditions.

A tracker type solar panel device may move itself (for example change a tilt angle) in intervals—whereas there is an idle period between adjacent movements (for example—movement of a few seconds and an idle period of five or more minutes). The robotic system may be configured to sense a movement of the solar panel device (during the provision of the surface cleaning device)—and may stop the alignment process, retreat, and repeat the provision of the robot after an estimated or measured completion of the movement of the solar panel device.

The robotic system may be configured to provide the surface cleaning device while preventing damage to the solar panel device or at least while reducing the chances of damaging the solar panel device.

The robotic system may be configured to safely provide the surface cleaning device while allowing the solar panel device to introduce up to a certain amount of movement to the robotic system.

The robotic system may be configured to safely provide the surface cleaning device by having limiting elements for limiting a movement between the solar panel device and a support unit of the robotic system only until a predefined force is applied by the solar panel device on the limiting element.

The robotic system may be self-propelled and may move along dedicated guiding elements and/or may move without any guiding elements.

The robotic system may be shaped and size to provide the surface cleaning device to solar panel devices located at different sides of the robotic system. For example—by having a first side and a second side that are opposite to each other—thereby allowing the surface cleaning device to be provided to a solar panel device located at the first side of the robotic system, and to be provided to a solar panel device located at the second side of the robotic system.

The robotic system may be shaped and sized to move along a gap formed between a first column of solar panel devices, and a second column of solar panel devices, and to supply the surface cleaning device to a solar panel device of either one of the first column and the second column while being positioned at the gap.

The robotic system may be configured to perform an alignment process taking into account at least one of (a) terrain information regarding a terrain on which the robotic moves, and (b) previous alignment information regarding previous alignment processors.

The robotic system may perform an alignment process while controlling multiple movement types along multiple axes and/or directions.

The robotic system is compact and includes few components which increases the durability—and reduce maintenance cost. This may be especially beneficial in harsh environmental conditions.

There may be provided a robotic system that can be allocated in an efficient manner, to convey, at different points of time, different surface cleaning devices.

While one surface cleaning device cleans a solar panel device another surface cleaning device may clean another solar panel device and/or may be moved from one solar panel device to another.

The robotic system may control various aspects of movements—of the robotic system itself and of the surface cleaning device. For example—the robotic system may move itself towards a solar panel device, and may move the surface cleaning device by at least two types of movements out of (a) a rotational movement along a first rotational axis for changing a tilt angle of a support unit that supports the surface cleaning device, (b) a height adjustment movement for determining a height of the support unit, and (c) an advance movement for advancing the support unit towards the solar panel device.

The movements denoted (a), (b) and (c) (and even the movement of the robotic system towards the solar panel device) may be regarded as movements along multiple axes.

FIG. 1 illustrates robotic system 400 that may include a control unit 410, communication unit 420, alignment unit 430, support unit 440, one or more sensing units 450, and a drive unit 460.

The control unit 410 may include one or more processing units and/or one or more control units. The processing units and/or control units may be integrated circuits, may include one or more integrated circuits, may belong to one or more integrated circuits, may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The control unit 410 may control the operation of the robotic system. It may, for example control a provision of a surface cleaning device to a solar panel device, may control a receiving of a surface cleaning device, may control movement of the robotic system, and the like.

The communication unit 420 may communicate using one or more communication manners—for example may be configured to perform wireless and/or wired communication, may communicate using one or more protocols, may communicate over one or more communication networks, and the like. It may include one or more communication components such as a network interface card, universal serial bus (USB) port, disk reader, modem or transceiver, and the like.

The drive unit 460 is configured to move the robotic system in relation to one or more solar panel devices.

The support unit 440 is configured to support and guide the movement of a surface cleaning device.

The alignment unit 430 is configured to align, during an alignment process, the support unit with a solar panel device. The alignment unit 430 may include mechanical elements such a motors and related elements. The alignment unit may include its own controller but, additionally or alternatively, may be controlled by the control unit 410.

One or more sensing units 450 that may be configured to sense the spatial relationship between the support unit and a solar panel device. This may include sensing multiple spatial relationships between multiple sensing units and multiple locations of the solar panel device.

Figure 2:
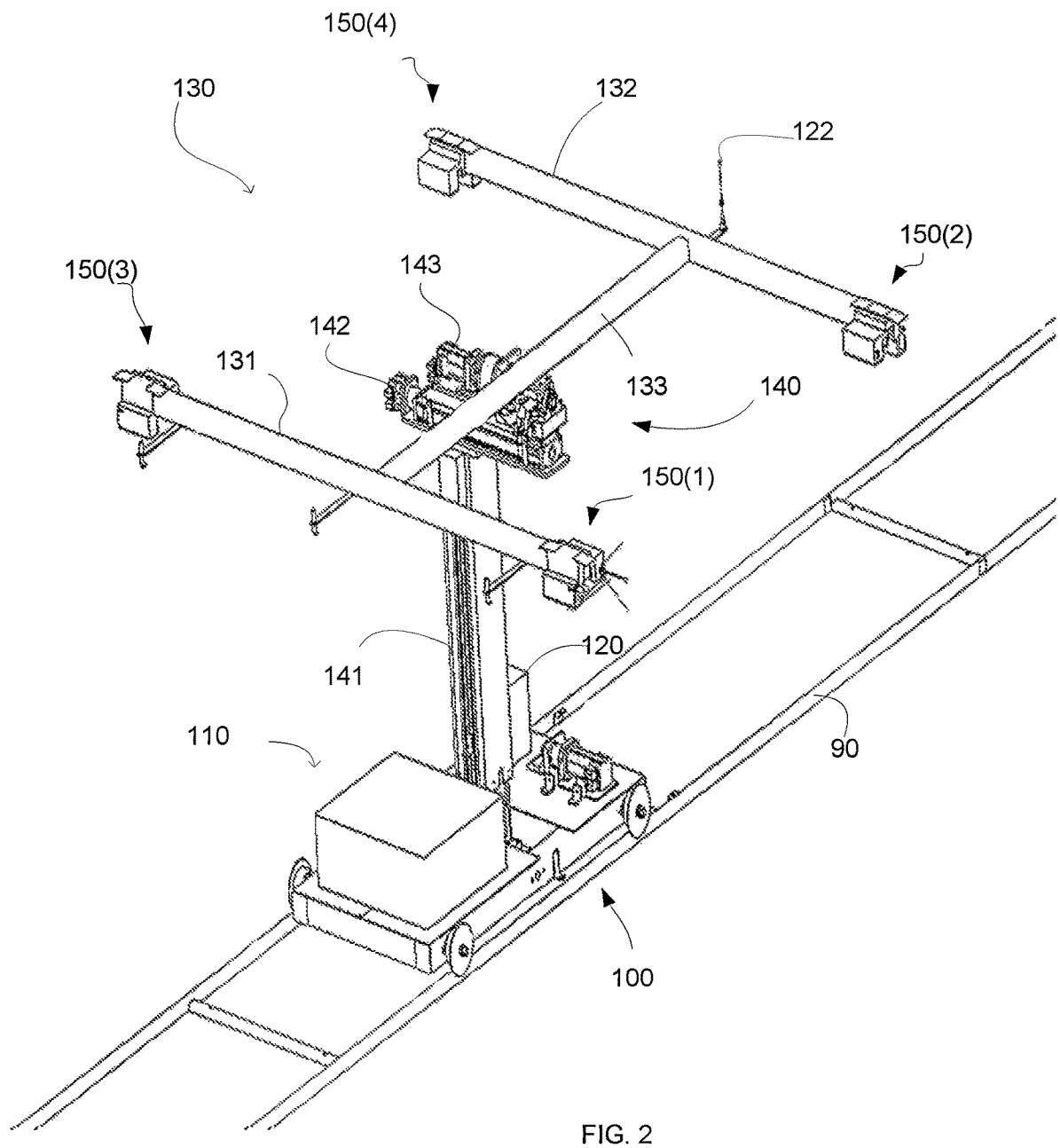
Figure 3:
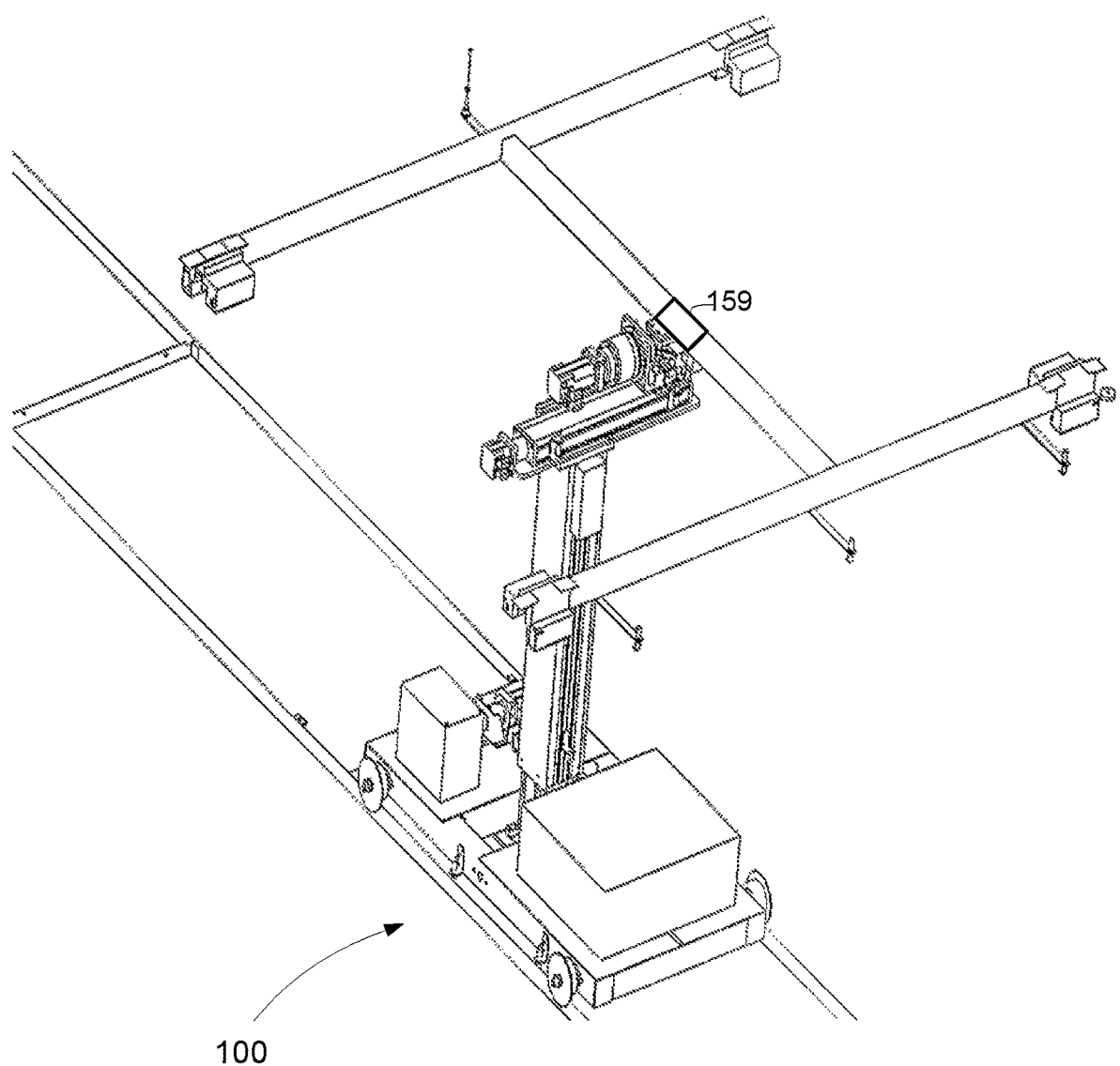
FIGS. 3-7 illustrate examples of various parts of a robotic system.
Figure 4:
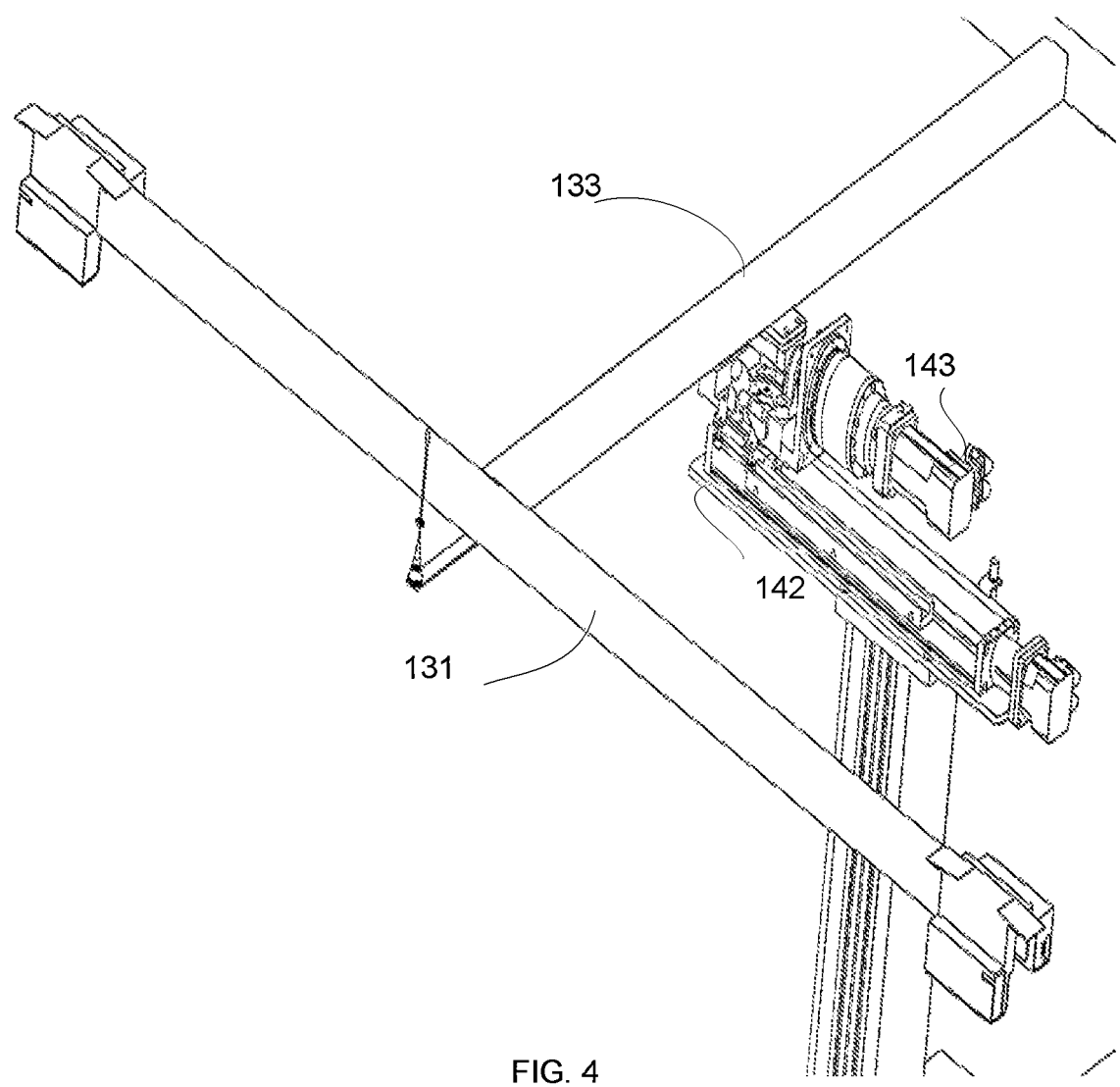
Figure 8:
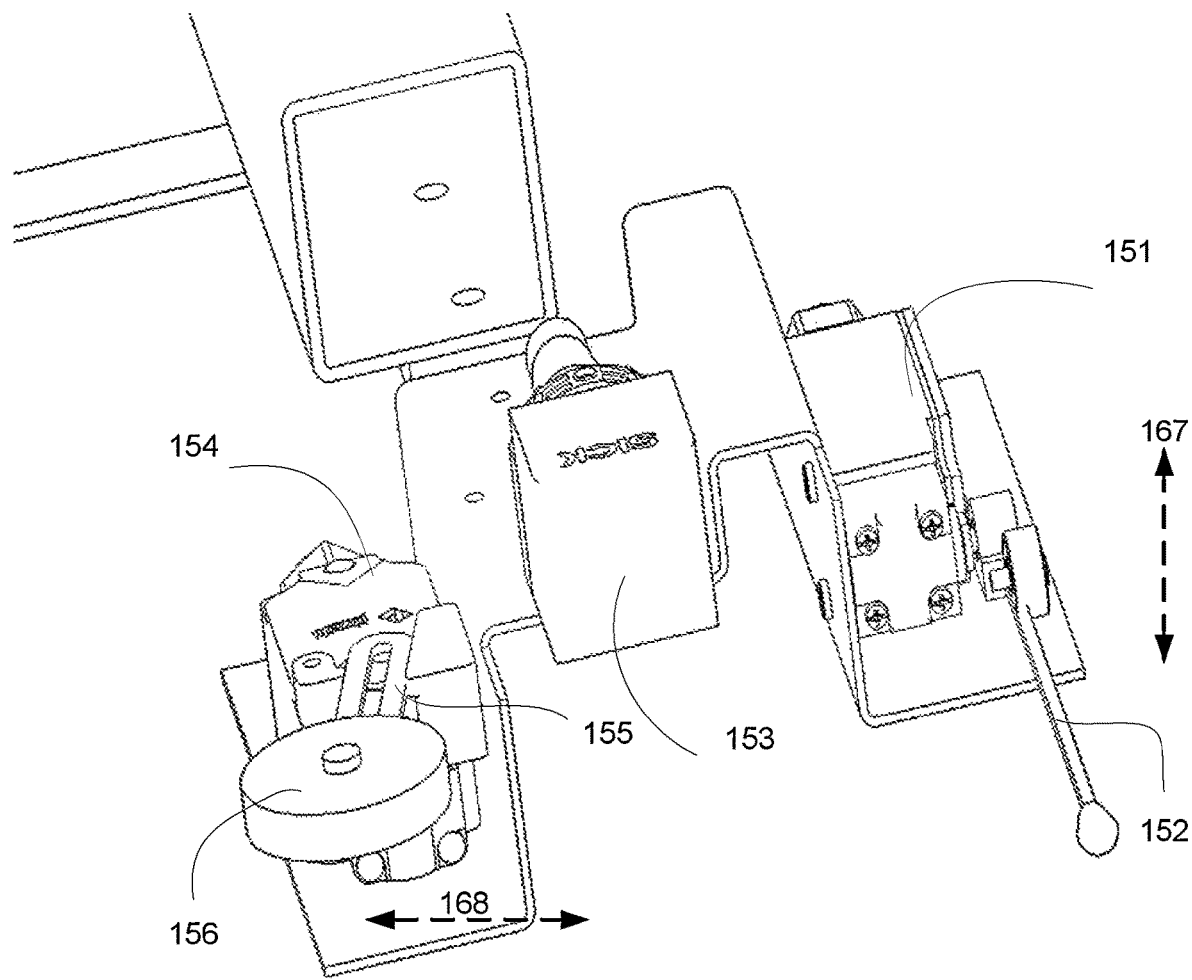
FIGS. 8-9 illustrate examples of sensors of a sensing unit.
Figure 9:
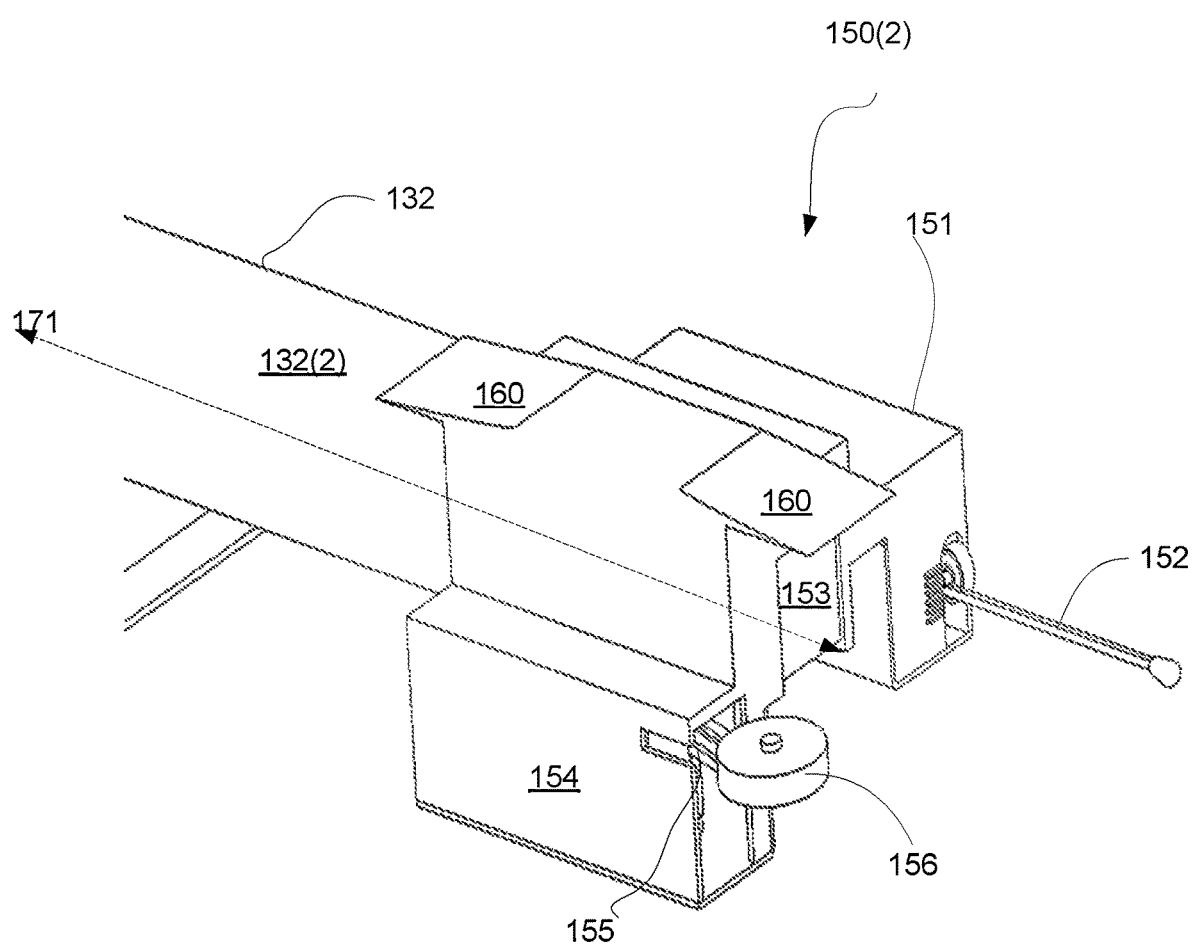
Figure 10:
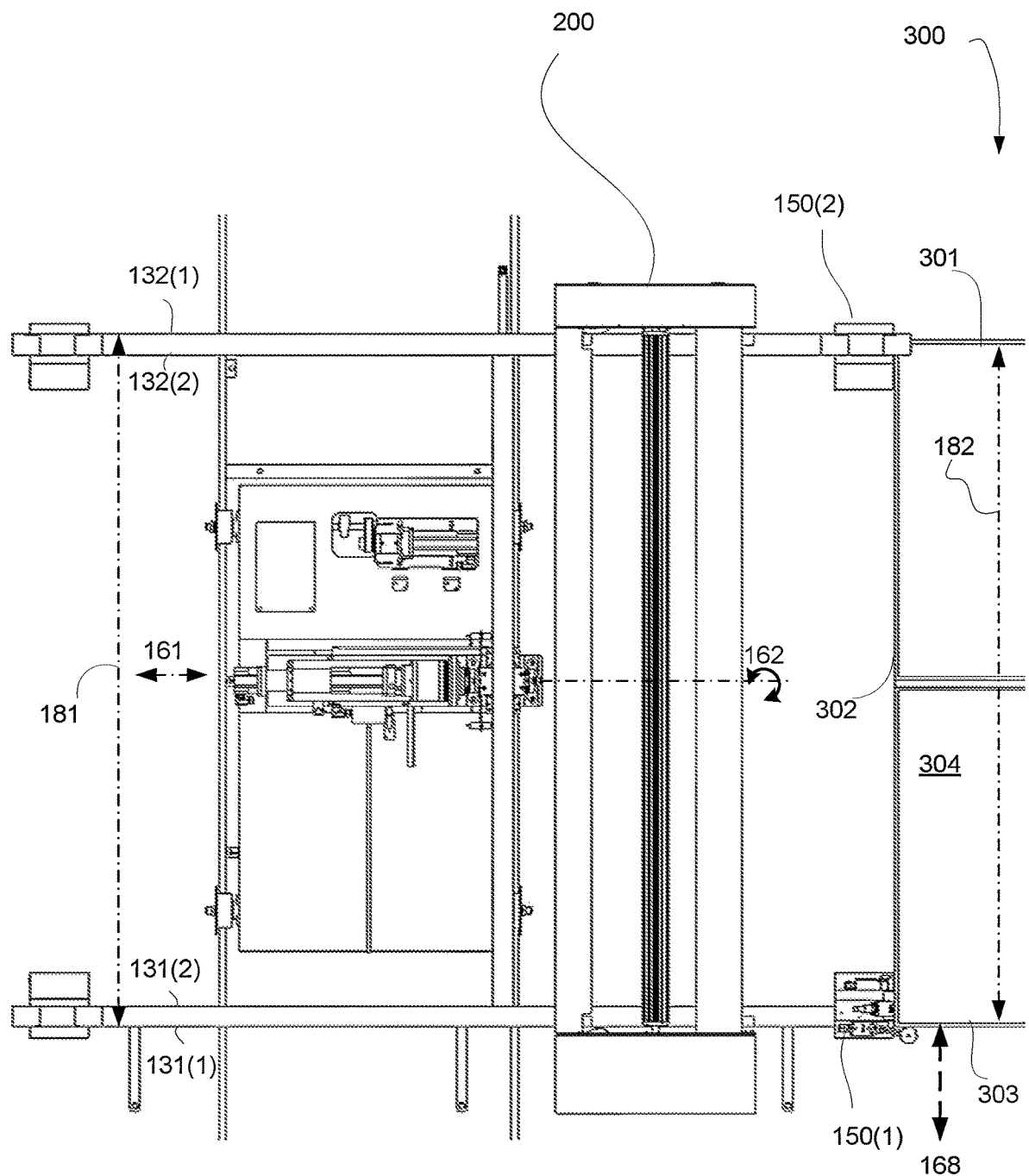
FIGS. 10-14 illustrate examples of a provision of a surface cleaning device to a solar panel device.
Figure 11:
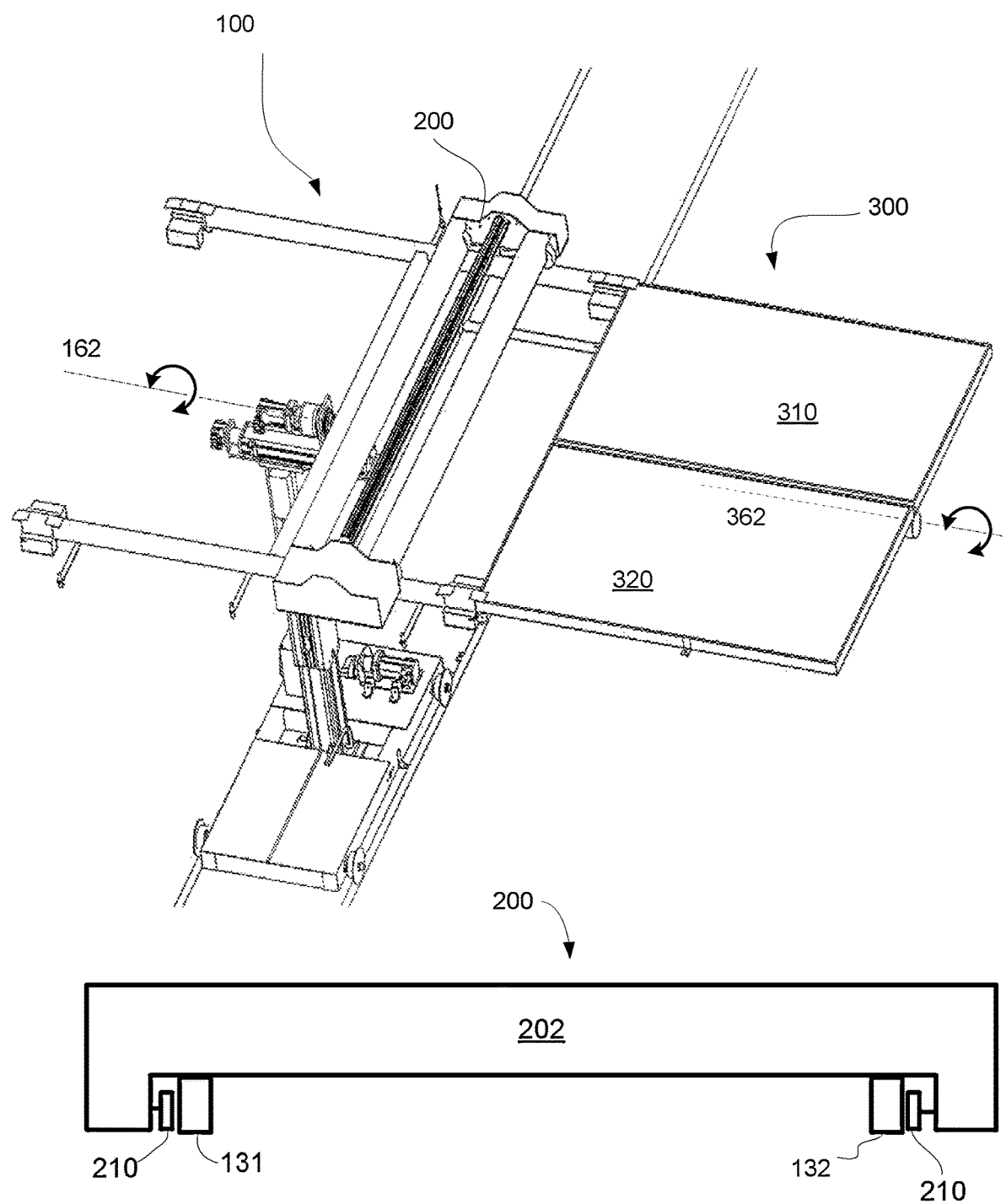

FIG. 2 and illustrates robotic system 100. FIGS. 3-7 illustrate various parts of the robotic system. FIGS. 8-9 illustrates example of sensors of a sensing unit. FIGS. 10-14 illustrate a provision of a surface cleaning device 200 to a solar panel device.

The structure illustrated in the following figures is compact, lightweight and robust. For example—the compactness may be illustrated by having a support unit that include a few guiding elements, and a connecting bar that can be moved a limited number of motors.

The robotic system 100 includes drive unit 110, control unit 120, communication unit 122, support unit 130, alignment unit 140 and sensing units such as first, second, third and fourth sensing units 150(1), 150(2), 150(3) and 150(4).

Drive unit 110 (illustrated as including base, wheels and one or more motors) that moves the robotic system along a rail 90. It should be noted that the robotic system may move with or without using rails or other terrain guiding elements.

Support unit 130 is illustrated as including first guiding element 131, second guiding element 132, and connecting bar 133 that is connected to first and second guiding elements.

Figure 5:
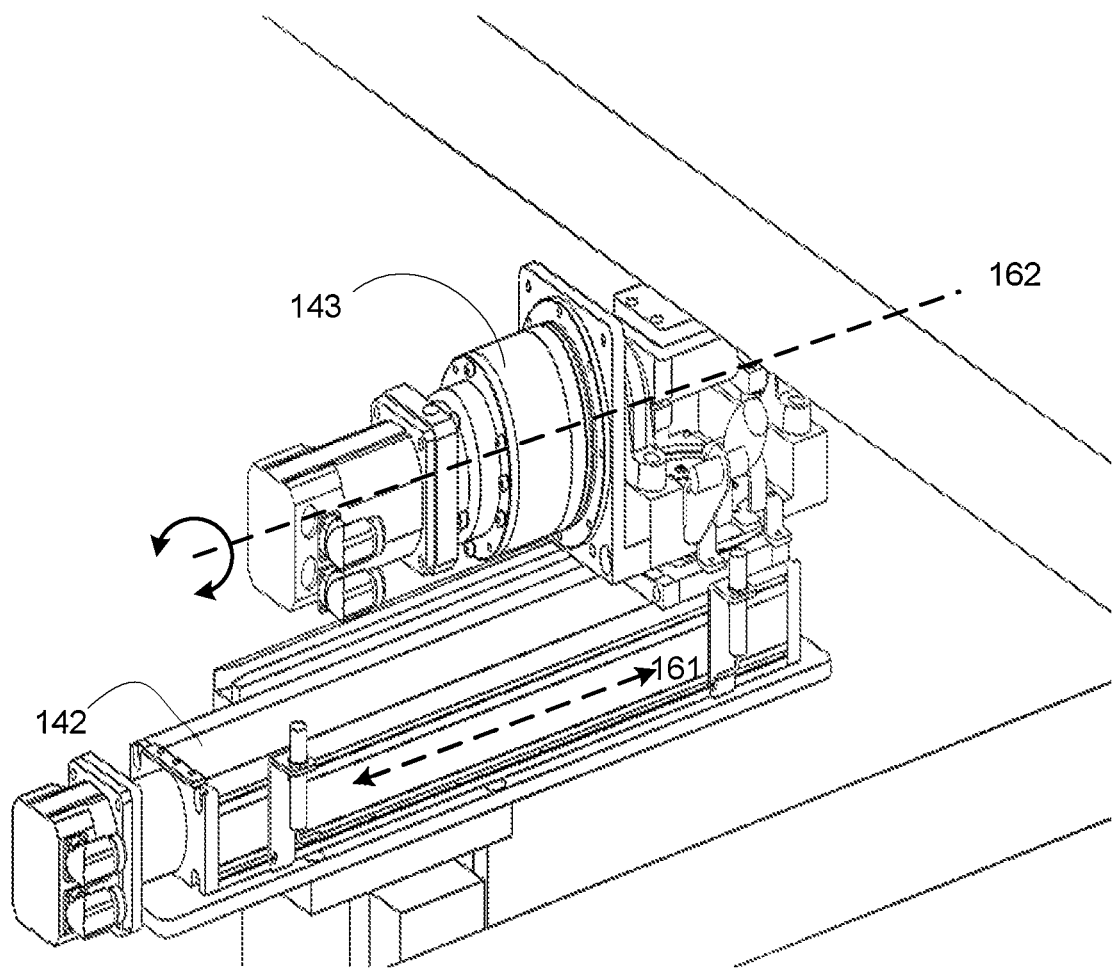

Alignment unit 140 includes up and down unit 141, approach motor 142, tilt motor 143 and may also include additional pivot (denoted 145 in FIG. 6) and moves the support unit along additional pivot axis 163). Referring to FIG. 5—approach motor 142 moves the support unit along approach axis 163, the tilt motor 143 moves the support unit along a first rotational axis 162.

First, second, third and fourth sensing units 150(1), 150(2), 150(3) and 150(4)—positioned at first and second ends of the first and second guiding elements. Any types of sensors may be used.

In order to download or upload surface cleaning device 200 from/to the solar panel device 300 and move it to another solar panel device, the robotic system 100 may be provided and may include a support unit 130 an up-down unit for lifting and lowering the support unit and two motors—such as (a) a tilt motor 143 for tilting a surface cleaning device conveyed by the robotic system, and (b) approach motor 142 (that may be a linear motor) for increasing or decreasing the distance (for example horizontal distance) between the robotic system and the solar panel device. The tile motor may be located below, at the same level or above the approach motor.

The robotic system may be configured to position the surface cleaning device at an initial (pre-set) position and then perform an alignment process for positioning the surface cleaning device at a final position in which an alignment is obtained. When in pre-set position the robotic system may be located at the side of the solar panel device—for preventing a collision with the solar panel device—regardless of the terrain in the vicinity of the solar panel device and/or regardless of the tilt angle of the solar panel device. There may be provided at least a minimal distance—for example between five and ten centimeters.

There may be markers and/or alignment elements spread over the solar panel field—for example one per one or more solar panel devices. The pre-set position may set based, for example, on counting steps of motors potentiometer/encoder (such as tilt motor and/or linear motor) and also physical positioning elements along the way for example with torch/flags along the support unit 130, to reduce distance errors (for example – to +/−2 cm).

When a solar panel device 300 is approached by the robotic system—the solar panel device may be positioned at a certain location and tilt.

The pre-set position may be determined, for example, on one or more previous positions of the solar panel device, and/or on the state (for example orientation and/or height) of the terrain located in the vicinity of the solar panel device.

After positioned in the pre-set position—the alignment process may start.

A sensing unit may include one or more sensors such as one or more of the following types of sensors:
  a. Proximity sensor 153 that identifies the solar panel device—for example by sensing metal (such as an aluminum of a frame of a solar panel device). The proximity sensor may be configured to detect a proximate solar panel device—and may cause the movement towards the pre-set condition to stop.
  b. A first inclination sensor 151 such as an analog limit switch with a first interfacing elements 152 such as a rod that once contacts the top or upper surface (upper surface is also referred to as external surface or just "surface") it may be inclined by a first inclination angle measured by the first inclination sensor—thereby providing information about inclination in relation to the surface of the solar panel.
  c. A second inclination sensor 154 with a second interfacing element (such as an arm 155 coupled to wheel 156) that may form a side wheel switch so that when wheel 156 contacts the sidewall of the solar panel device it may be inclined by a second inclination angle measured by the second inclination sensor—thereby providing information about inclination in relation to the sidewall of the solar panel. An alignment along the second inclination axis is required so that the wheels of the surface cleaning robot may smoothly travel from the first and second guiding elements to the sidewalls of the solar panel device. If there is a misalignment (may be a step or gap) the wheel will move to the outside of the sidewall and provide a second axis inclination. The wheel and arm may be replaced by another interfacing element. The angular position of the wheel together with the wheel itself may reduce the chances of movement of the surface cleaning robot to and from the solar panel device.

It should be noted that the sensing unit may or may not include one or more other sensors may be provided—for example, a visual sensor (denoted 159 in FIG. 3) may be provided and located at any location of the robotic system. Visual information from the visual sensor may be processed in various manners—for example by searching for a solar panel device edge pattern, and once found—determining the spatial relationship between the visual sensor and the solar panel device.

The visual sensor may be used as an additional sensor and/or a verification sensor. It may be useful, for example, when the robotic system has lost track of its position in relation to the solar panel device.

The robotic system 100 may align the surface cleaning device with the solar panel device at high accuracy—for example, at an accuracy of +/−2 mm—the accuracy needed to roll the surface cleaning device between the robotic system and the solar panel device.

After positioned in the pre-set position, the robotic system may further move the surface cleaning device towards the surface of the solar panel device—using, for example, sensed information from at least one of proximity sensor 153, first inclination sensor 151, and second inclination sensor—as this further movements may be executed while the solar panel device is within the sensing range of these sensors. This further movement may position the surface cleaning device at a position where it is below (for example 5 cm below) the surface of the solar panel device and to the side (for example 5 cm away) from the solar panel device in the approaching movement.

Figure 12:
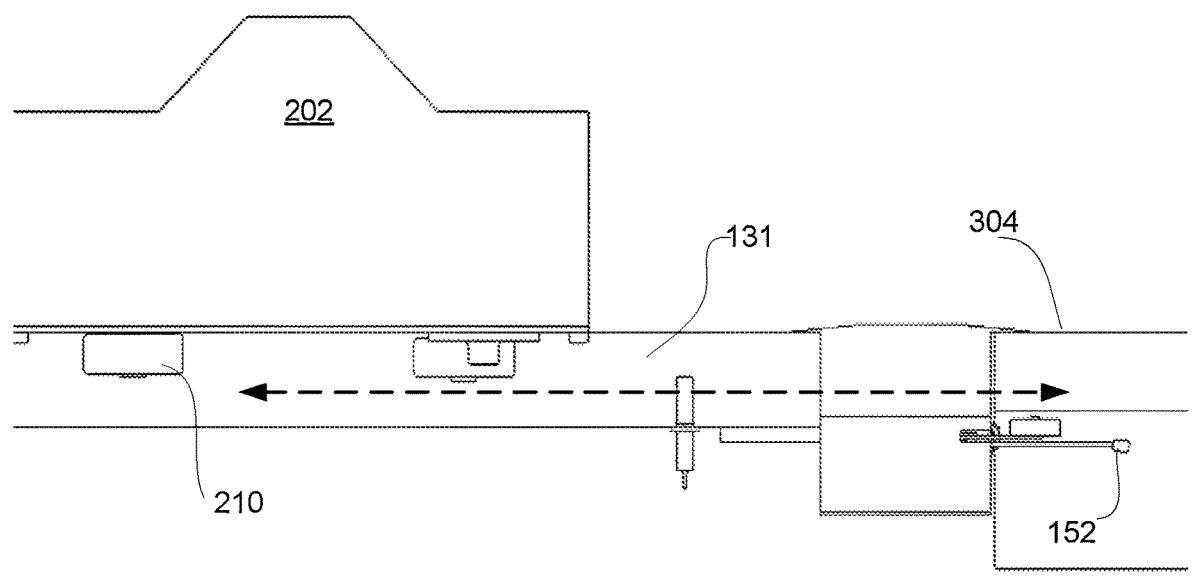
Figure 13:
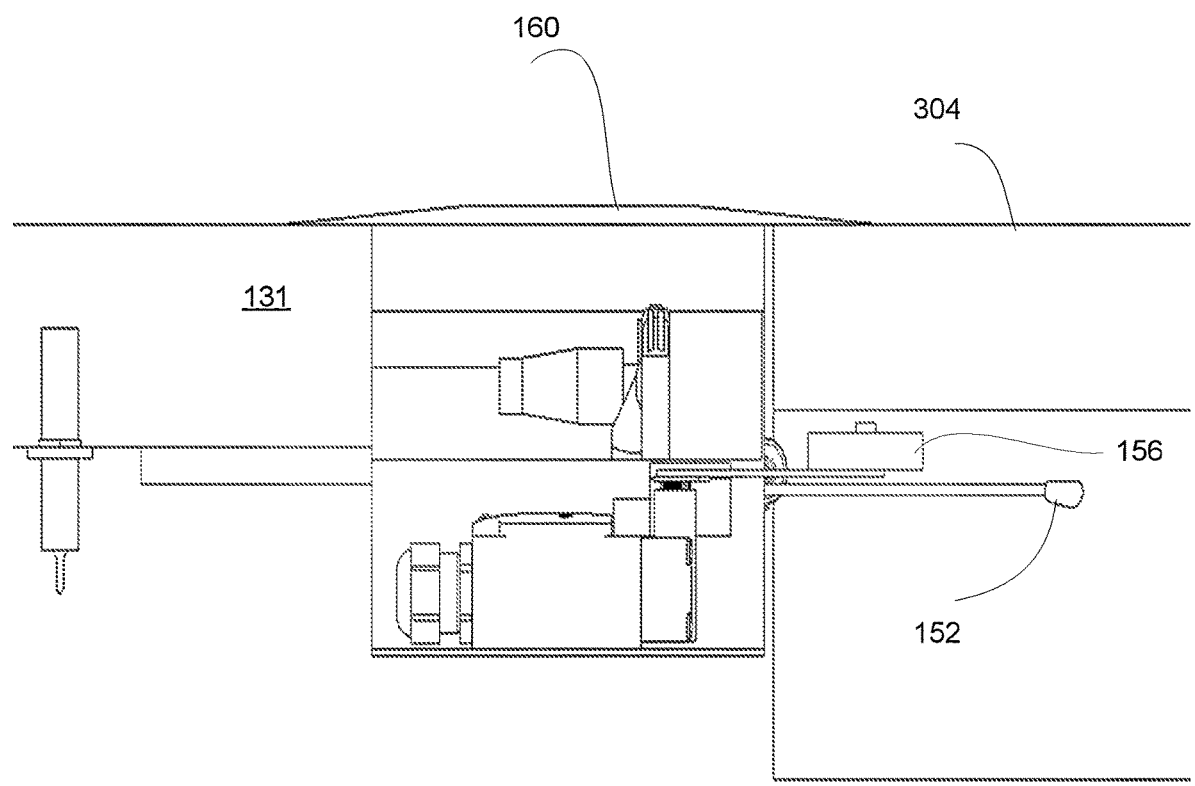
Figure 14:
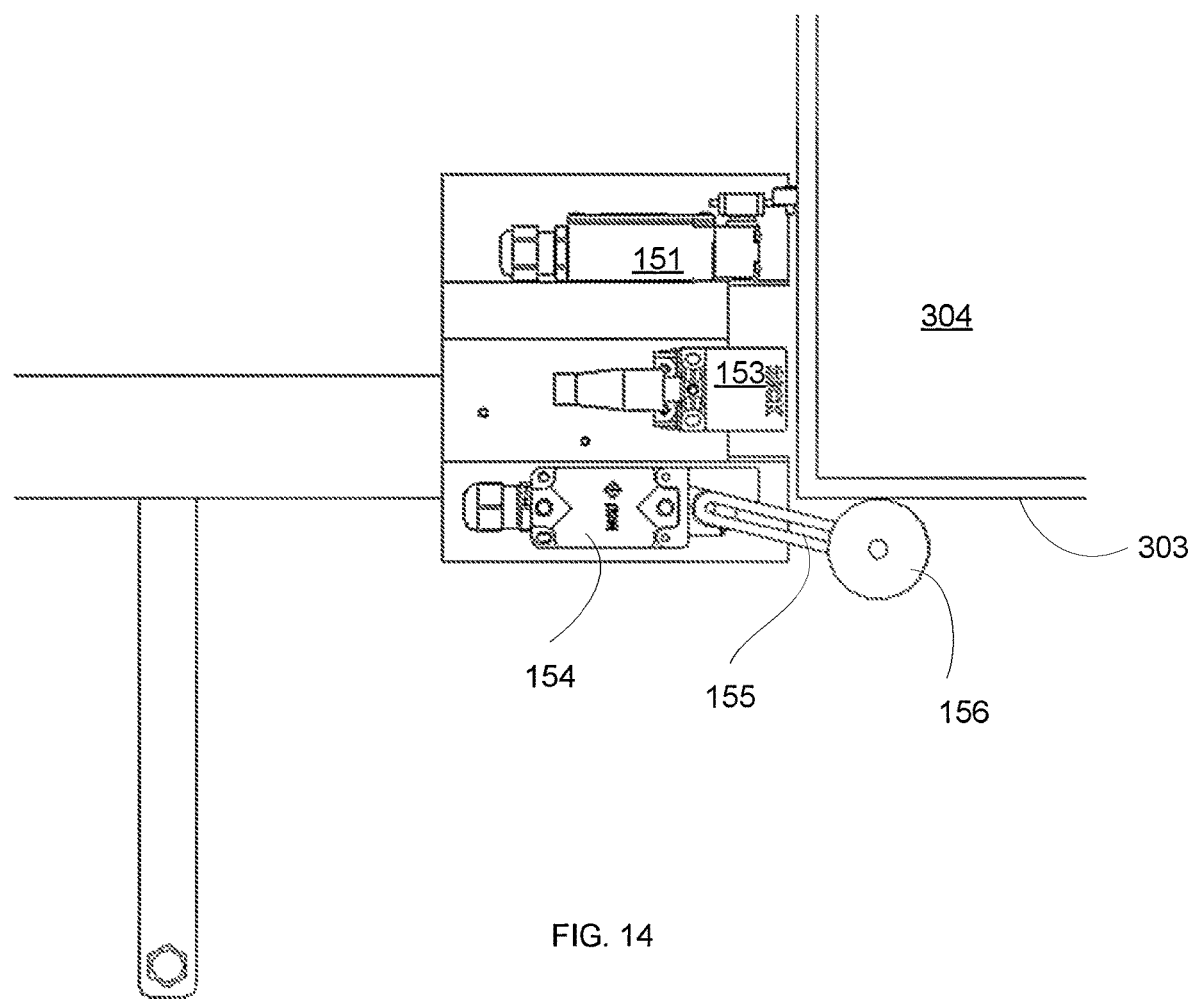

At the end of the further movement the first interfacing element of sensing units located at the relevant side (for example left or right side) may be below the solar panel device—see FIG. 12.

It should be noted that solar panel devices of the same column (of the same solar plant) may be similar to each other and tracking step may be relatively limited (for example—angular change of up to 4 degrees). Accordingly—the tile angle of different solar panel device (at the same time) may be substantially equal to each other.

After the first interfacing element of the different sensing units of the relevant side (side of the robotic system that interfaces with the solar panel device) are placed below the solar panel device—then the robotic system may elevate the support unit until one of the sensors sensed a contact between any of the long rods and the solar panel device.

The tilting of the support unit of the robotic system may be based on sensed information provided by different inclination sensors of one or more sensing units.

For example—assuming that there are two sensing units configured to sense the inclination at two locations.
  a. When the surface cleaning device is parallel to the surface of the solar panel device—the two right side sensing units should sense the same inclination.
  b. When one inclination sensor measures an inclination that substantially deviates from the inclination sensed by another corresponding inclination sensor—then the surface cleaning device is not parallel to the surface of the solar panel device.
  c. Changes in inclination—for example at opposite directions—may indicate that the solar panel device is moving—and the robotic system may respond—for example by withdrawing or by allowing the robotic system to operate in a floating mode in which the rotation of the solar panel device is allowed to rotate the support unit.

The parallelism may be obtained and the robotic system may elevate the surface cleaning device to be positioned above the surface of the solar panel device.

This may be followed by further decreasing the distance between the surface cleaning device and the solar panel device—by using approach motor—for example until proximity sensor 153 senses the presence of the solar panel device.

If there is a misalignment at the side of the solar panel device (for example along an axis that is normal to a sidewall of the solar panel device) then the side wheels sensor may trigger an alignment until this misalignment is cancelled (or reduced below a threshold—for example below 2 mm).

When sensed information from the sensing units a indicate of alignment—then the robotic system may lower the support unit till reaching an alignment—and allowing a limiting element such as tongue 160 for contacting the surface of the solar panel device. The limiting element may be made of plastic or any other material and may be located above or below the path followed by the side wheels of the surface cleaning robot.

The alignment process may be controlled based on the spatial relationship between the robotic system and the solar panel device—and not solely to the ground.

The limiting element and the floating mode of the alignment unit protects the solar panel device. The limiting element may interface with the support unit and the upper surface of the solar panel device—but may bend or break when the solar panel device deviates from the support unit—when the deviation causes the solar panel device to apply at least a predefined force on the limiting element—thereby prevents from holding the solar panel device despite a deviation—and protects the solar panel device.

The floating mode of the alignment unit allows the support unit to move due to movement of the solar panel device (for example due to rotation). For example—the tilt motor may allow tilts, the other pivot may allow rotation.

The various motors of the robotic system may have a preset position. A preset position is a known position (for example a known tilt angle, a known linear location). The state of a motor can be monitored by tracking changes from the preset position. In case of failure in the control unit of the robotic system, the recovery may include returning to the preset position.

Figure 6:
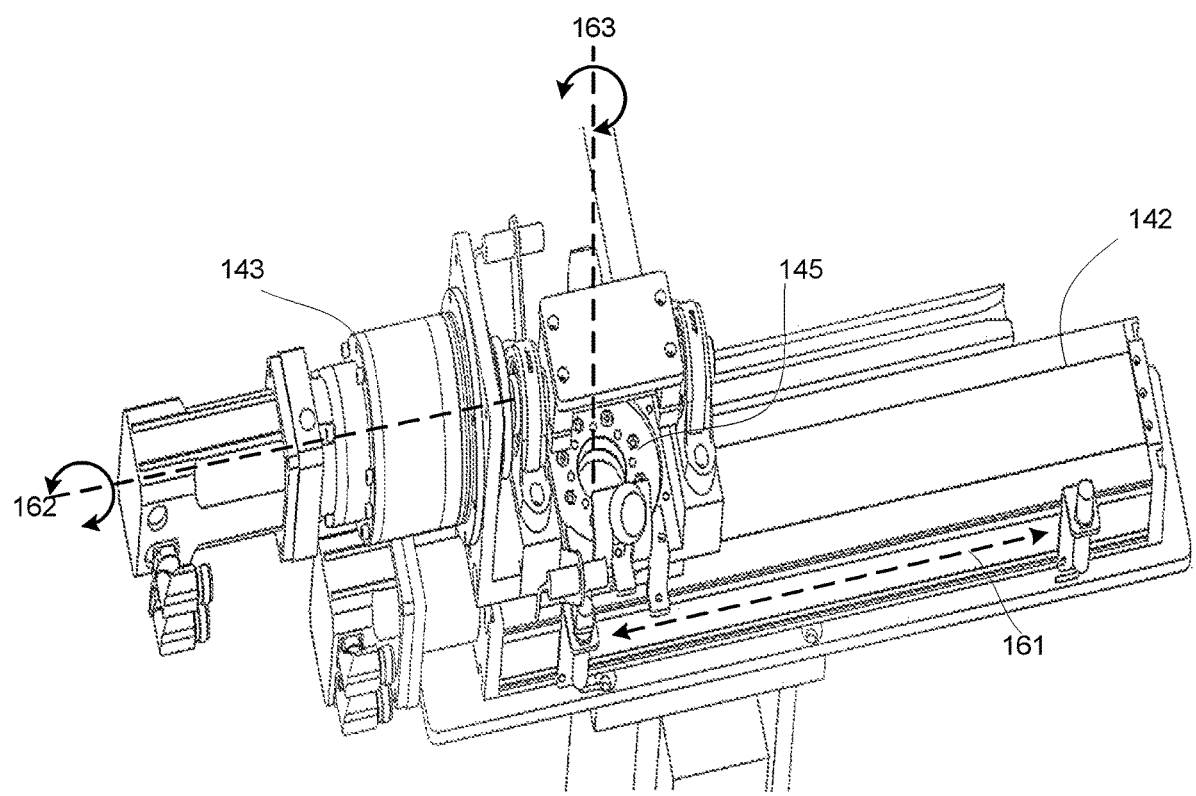
Figure 7:
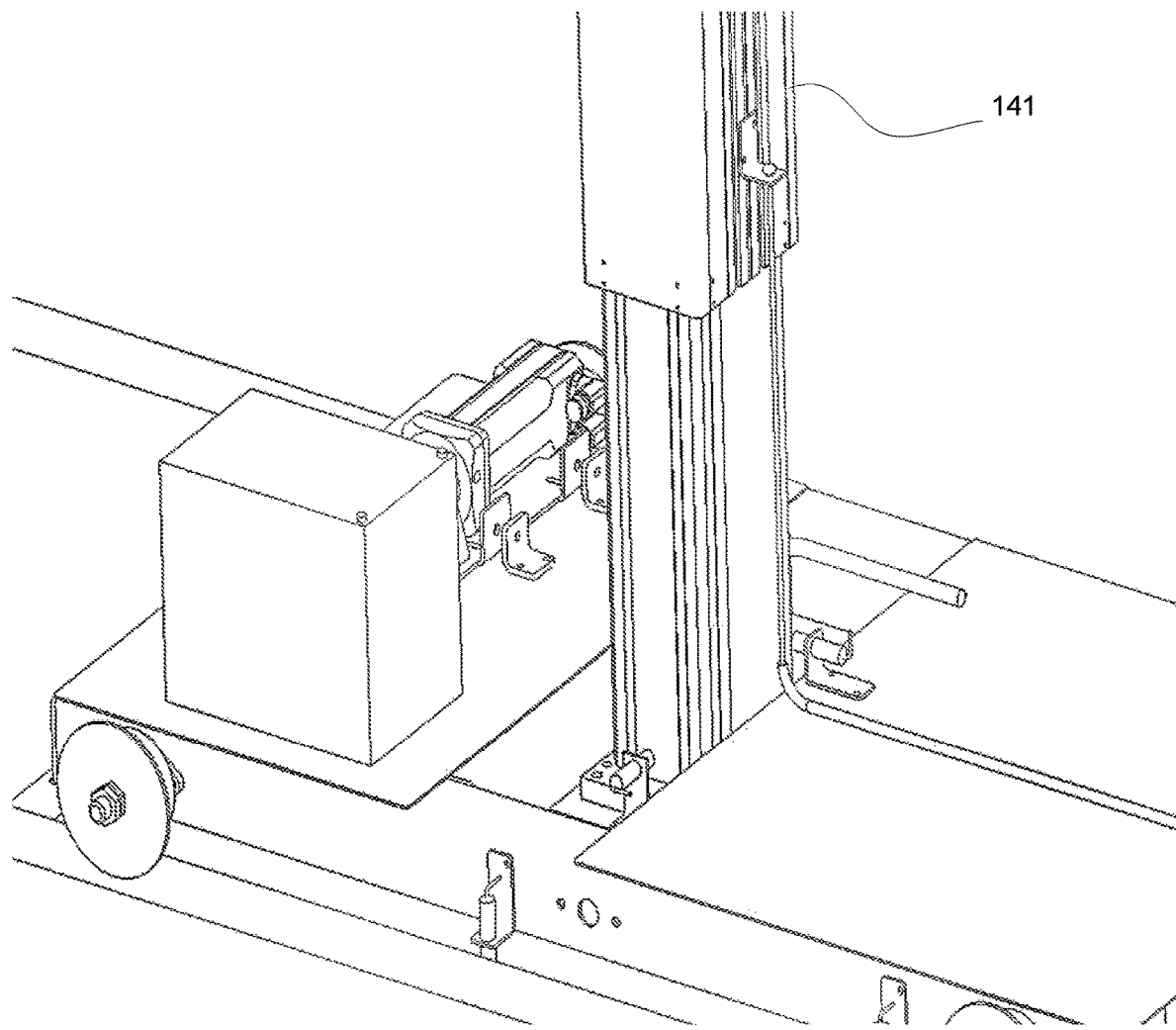

FIG. 6 illustrates the other pivot 145—allowing the support unit to be rotated about another axis of rotation—which may be normal or otherwise oriented to the first axis of rotation. Other pivot 145 mechanically coupled the approach motor 142 to the tilt motor 142—and allows rotation about another axis of rotation. This allows the support unit (and hence the surface cleaning device) to swing (for example during the end of the movement toward the solar panel device) to the side (for example by up to a few degrees—for example 2 degrees).

This swinging allows, in case where the installation was not completely parallel, to be able to reduce the gaps between the support unit 130 and the solar panel device 300 on the edges, where the wheels of the robot need to pass smoothly.

A control system may be provided and may be configured to determining various aspects related to cleaning of one or more solar panel device within at least one surface cleaning devices. These aspects may include when to provide a surface cleaning device, to which solar panel device to provide a surface cleaning device, to which side of a robotic system to provide a surface cleaning device, duration of cleaning a solar panel device by a surface cleaning device, any aspect of cleaning a solar panel device (when to start, when to finish, cleaning mode, when to evacuate the surface cleaning device from the farm, perform maintenance decisions), one or more movement of any robotic system within a solar farm, and the like. The control system may apply the control based on additional information such as environment conditions (for example wind strength, wind direction, humidity, rain, temperature, ambient light and the like), direction of approach, time of day, date, and the like. For example not cleaning when the solar panel device are too humid (humidity above a predefined threshold), and the like.

There may be provided one or more robotic systems configured to move and provide one or more surface cleaning devices to one or more solar panel devices. A single surface cleaning device may be schedule a single solar panel device.

The provision of one or more surface cleaning devices to one or more solar panel devices may be determined in various manners and/or based on one or more parameters—for example—increasing the effectiveness of the cleaning of solar panel device, increasing the efficiency of the provision of surface cleaning devices to different solar panel devices, reducing idle periods during which a pool cleaning robot waits to be taken from one solar panel device to another, reducing concurrent endings of cleanings of different solar panel devices, reducing bottlenecks that may result from the cleaning process or the conveying of one or more surface cleaning devices by one or more robotic systems, and the like.

The determining can be made by the control system, by one or more robotic systems, and the like.

Figure 15:
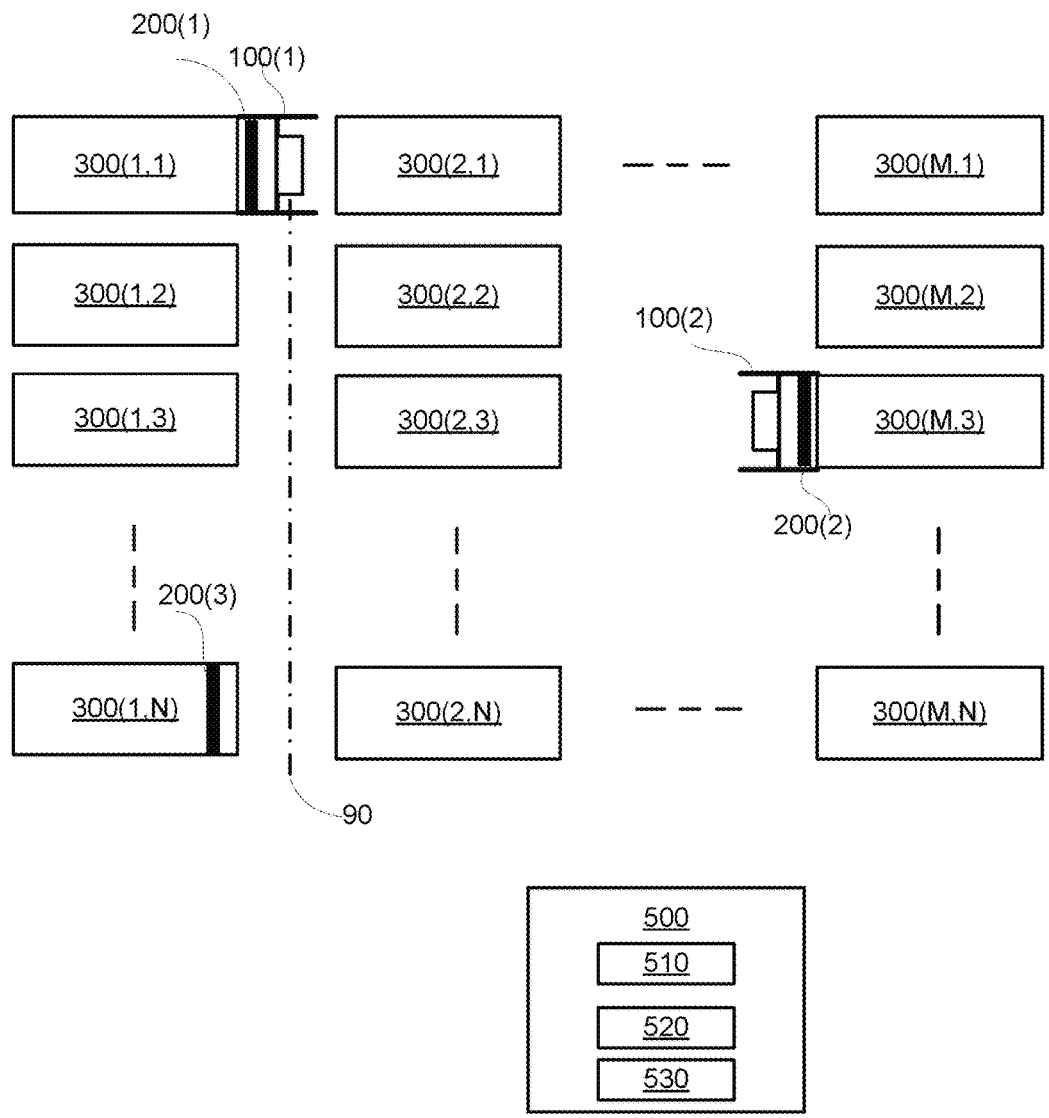
FIG. 15 illustrates an example of a solar panel field.

FIG. 15 illustrates a solar field of N rows and M columns of solar panel device 200(1,1)-300(M,N), whereas N and M are integers that exceed one.

First robotic system 100(1) moves within a gap between first and second columns and conveys a first surface cleaning device 200(1) to solar panel device 300(1,1) that is located to the left of first robotic system 100(1).

Second robotic system 100(2) moves within a gap between the (M−1)'th and the M'th columns and conveys a second surface cleaning device 200(2) to solar panel device 300(M,3) that is located to the right of second robotic system 100(2).

Third surface cleaning device 200(3) cleans solar panel device 300(1,N). There may be any number of surface cleaning devices and/or robotic systems and/or solar panel devices.

Control system 500 may control one or more aspects of the cleaning of the solar panel devices—and may apply any scheme to control the one or more aspects. For example— the control system may increase the efficiency of cleaning, increase the efficiency of transporting surface cleaning devices (for example prevent bottlenecks, introduce a timing gap between the reception of different surface cleaning devices by the same robotic systems).

The control system 500 may include memory 510 for storing information and/or commands, one or more processing circuits 520 for performing monitoring and/or control tasks, and communication unit 530.

The following text illustrates one or more configurations of the robotic system. Any combination of any units and/or elements of components listed below (or in any other place in the application) may be provided.

There may be provided a robotic system for providing a surface cleaning device to a solar panel device, wherein the robotic system may include: a drive unit that may be configured to move the robotic system in relation to the solar panel device; a support unit that may be configured to support the surface cleaning device and guide a movement of the surface cleaning device towards the solar panel device; an alignment unit that may be configured to align, during an alignment process, the support unit and the solar panel device; a sensing unit that may be configured to sense a spatial relationship between the support unit and the solar panel device; and a control unit that may be configured to control the alignment unit based on, at least, the spatial relationship.

The sensing unit may include a proximity sensor, and one or more inclination sensors that are analog and are not visual sensors.

The alignment unit may be configured to align the support unit and the solar panel device by multiple types of movements, the multiple types of movement may include a rotational movement along a first rotational axis for changing a tilt angle of the guiding elements in relation to the first rotational axis; wherein a maximal absolute value of a change of the tilt angle may be not smaller than forty five degrees in relation to the horizon.

The control unit may be configured to (a) obtain previous alignment information regarding previous alignment processors, and (b) control the alignment unit based on, at least, the spatial relationship and the previous alignment information.

The control unit that may be configured to (a) obtain terrain information regarding a terrain on which the robotic moves, and (b) control the alignment unit based on, at least, the spatial relationship and the terrain information. The terrain information may reflect the terrain near one or more solar panel devices. The terrain information may be indicative of height, inclination and any other terrain property such as type of terrain (sand, concrete, rocks), and the passability of the terrain.

The support unit may be configured to support the surface cleaning device, and guide a movement of the surface cleaning device towards the solar panel device. The movement may be selected, based on a location of the solar panel device, to a movement towards a first side of the robotic system and a movement towards a second side of the robotic system.

The robotic system may include a communication unit that may be configured to inform and/or command/and/or request the surface cleaning robot whether to move towards the first side of the robotic system or towards the second side of the robotic system.

The control unit may be configured to (a) control the alignment unit based on, at least, the spatial relationship; (b) determine that the solar panel device may be moving during the alignment process; and (c) respond to the movement.

The control unit may be configured to respond by stopping the alignment process and cause the drive unit to move the robotic system from the solar panel device following the determination that the solar panel device may be moving during the alignment process.

The control unit may be configured to reinitiate the alignment process when estimating that the moving of the solar panel device ended.

The alignment unit may be configured to align, during an alignment process, the support unit and the solar panel device; wherein the alignment unit may be configured to enable the solar panel device to move at least one mechanical element of the alignment unit; one or more sensing units that are configured to sense a spatial relationship between the support unit and the solar panel device.

The support unit may include guiding elements, the guiding elements are configured to support the surface cleaning device; wherein the guiding elements may include a first guiding element and a second guiding element.

The alignment unit may be configured to align, during an alignment process, the first guiding element and the second guiding element with the solar panel device.

The sensing units may include a first sensing unit and a second sensing unit. The first sensing unit may be configured to sense a first spatial relationship between the first guiding element and a first portion of the solar panel device. The second sensing unit may be configured to sense a second spatial relationship between the second guiding element and a second portion of the solar panel device. The control unit may be configured to control the alignment unit based on, at least, the first spatial relationship and the second spatial relationship.

The alignment unit may be configured align the first guiding element and the second guiding elements with the solar panel device by performing at least one out of (a) a rotational movement along a first rotational axis for changing a tilt angle of the guiding elements in relation to the first rotational axis, (b) a height adjustment movement for determining a height of the support unit, and (c) an advance movement for advancing the support unit towards the solar panel device.

The alignment unit may include a rotating mechanism for performing the rotational movement, wherein the rotating mechanism may be configured to facilitate a solar panel device induced movement of the support unit.

The alignment unit may include a rotating mechanism for performing the rotational movement along a tilt angular range that spans between at least forty five degrees to minus forty five degrees in relation to a horizon.

The alignment unit may be configured to align the first rotational axis with a rotational axis of the solar panel device, when the solar panel device may be a tracking solar panel device that has a rotational axis.

The first guiding element and the second guiding element are positioned within a virtual plane.

The first rotational axis may be located below the virtual plane.

Each sensing unit of the first sensing unit and the second sensing unit may include a first inclination sensor and a first interfacing element that extends from the sensing unit toward the solar panel device, wherein the first inclination sensor may be configured to sense an inclination of the first interfacing element along a second axis that may be oriented to the virtual plane, wherein the first inclination sensor may be analog and may be not a visual sensor.

Each sensing unit may include a second inclination sensor and a second interfacing element that extends from the sensing unit towards the solar panel device, wherein the second inclination sensor may be configured to sense an inclination of the second interfacing element along a third axis that may be oriented to the second axis.

The first inclination sensor may be a bar and the second interfacing element may include a wheel that may be mechanically coupled to an arm.

Each sensing unit may include a proximity sensor for sensing a presence of the solar panel device within a proximity of the proximity sensor.

The alignment unit may be configured to:
a. position the robotic system in an initial position in which the first guiding element and the second guiding element are below and are positioned to the side of a surface of the solar panel device;
b. elevate the first guiding element and the second guiding element and position the first guiding element and the second guiding element within a virtual plane that may be substantially parallel to the surface and above the surface; and
c. move the first guiding element and the second guiding element from the side of the surface towards the surface, and lower the first guiding element and the second guiding element to reach alignment.

The first guiding element may include a first bar that has a first exterior part and a first internal part, the second guiding element may include and second bar that has a second exterior part and a second internal part.

The distance between the first exterior part and the second exterior part substantially equals a width of the solar panel device.

The distance between the first exterior part and the second exterior part substantially equals a width of the solar panel device.

The control unit may be configured to determine that the solar panel device may be moving during the alignment process.

The control unit may be configured to stop the alignment process and cause the drive unit to move the robotic system from the solar panel device following the determination that the solar panel device may be moving during the alignment process.

The control unit may be configured to request the surface cleaning device to move towards the solar panel device and to mount on the solar panel device when the first guiding element and the second guiding element are aligned with the solar panel device.

Each guiding element of the first guiding element and the second guiding element has a first side and a second side, and may be configured to guide the surface cleaning device to move between the first side to the second side.

The robotic system may be shaped and sized to (a) move along a gap formed between a first column of solar panel devices, and a second column of solar panel devices, and (b) supply the surface cleaning device to a solar panel device of either one of the first column and the second column while being positioned at the gap.

The robotic system may include at least one limiting element for limiting a movement between the solar panel device and the support unit.

Each of the at least one limiting element may be configured to limit the movement only until a predefined force may be applied by the solar panel device on the at least one limiting element.

The robotic system may include at least one limiting element may include at least one first limiting element that extends from the first sensing unit and at least one second limiting element that extends from the second sensing unit.

The drive unit may have a rail interface for guiding the robotic system to move along a rail.

Figure 16:
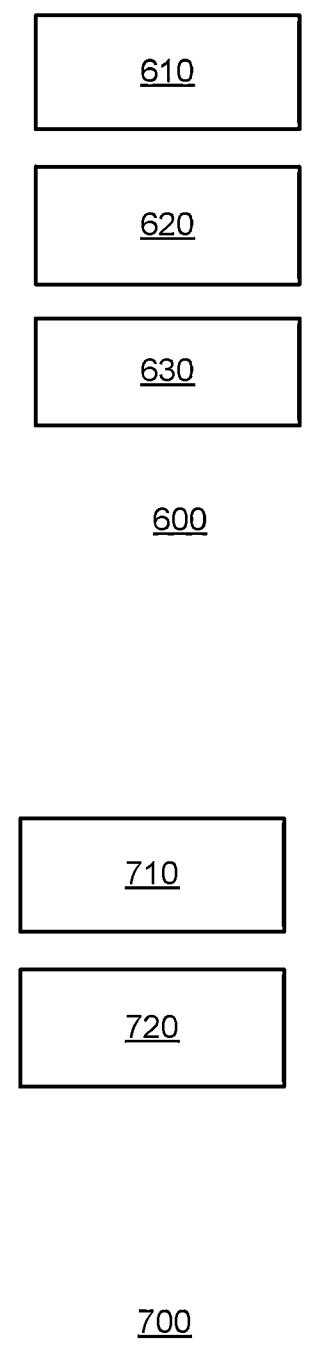

FIG. 16 illustrates examples of methods 600 and 700.

Method 600 may include steps 610, 620 and 630.

Step 610 may include using a robotic system to provide a surface cleaning device to a solar panel device.

Step 620 may include using a robotic system to receive a surface cleaning device from a solar panel device.

Step 630 may include moving the robotic system.

The robotic system may be any of the robotic systems illustrate din the application.

Method 700 may include steps 710 and 720.

Step 710 may include controlling (for example by a control system) one or more robotic systems for (a) providing one or more surface cleaning devices to one or more solar panel devices and/or (b) receiving the one or more surface cleaning devices from the one or more solar panel devices.

Step 720 is optional and may include controlling one or more other aspects of the cleaning of the one or more solar panel devices.

The following reference numbers are used in the specification and drawings.

| | |
|---|---|
| 90 | rail |
| 100, 400 | robotic system |
| 110, 460 | drive unit |
| 120, 410 | control unit |
| 130, 440 | support unit |
| 131 | first guiding element |
| 132 | second guiding element |
| 133 | connecting bar |
| 140 | alignment unit |
| 141 | up-down unit |
| 142 | approach motor |
| 143 | tilt motor |
| 145 | additional pivot |
| 150, 450 | one or more sensing units |
| 150(1)-150(4) | first till fourth sensing units |
| 151 | first inclination sensor for sensing inclination about second axis 167 |
| 152 | rod |
| 153 | proximity sensor |
| 154 | second inclination sensor for sensing inclination about third axis 168 |
| 155 | arm |
| 156 | wheel |
| 161 | first rotational axis |
| 162 | approach axis |
| 163 | additional pivot axis |
| 171 | path of surface cleaning device |
| 181 | distance between external surfaces of first and second guiding units |
| 182 | width of solar panel device |
| 200 | surface cleaning device |
| 202 | body of surface cleaning device |
| 210 | sidewheels of surface cleaning device |
| 300, 300(1, 1)-300(M, N) | solar panel device |
| 301-303 | sidewalls of the solar panel device |
| 302 | front edge of solar panel device |
| 304 | surface (to be cleaned) of the solar pane device |
| 310, 320 | solar panels |
| 362 | tilt axis of solar panel device |

| | |
|---|---|
| 420 | communication unit |
| 430 | alignment unit |
| 500 | control system |
| 510 | memory |
| 520 | one or more processing circuits |
| 530 | communication unit |

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between blocks are merely illustrative and that alternative embodiments may merge blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. However, other modifications, variations and alternatives are also possible. The specifications and drawings are, accordingly, to be regarded in an illustrative rather than in a restrictive sense.

In the claims, any reference signs placed between parentheses shall not be construed as limiting the claim.

The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any reference to the terms "comprising", "comprises", "including", "includes", should be applied mutatis mutandis to "consisting" and should be applied mutatis mutandis to "consisting essentially of".

We claim:

1. A robotic system for providing a surface cleaning device to a solar panel device, wherein the robotic system comprises:
    a drive unit that is configured to move the robotic system in relation to the solar panel device;
    a support unit that comprises guiding elements, the guiding elements are configured to support the surface cleaning device; wherein the guiding elements comprise a first guiding element and a second guiding element;
    an alignment unit that is configured to align, during an alignment process, the first guiding element and the second guiding element with the solar panel device;
    sensing units that comprises a first sensing unit and a second sensing unit; wherein the first sensing unit is configured to sense a first spatial relationship between the first guiding element and a first portion of the solar panel device; wherein the second sensing unit is configured to sense a second spatial relationship between the second guiding element and a second portion of the solar panel device; and
    a control unit that is configured to control the alignment unit based on, at least, the first spatial relationship and the second spatial relationship.

2. The robotic system according to claim 1 wherein the alignment unit is configured align the first guiding element and the second guiding elements with the solar panel device by performing at least one out of (a) a rotational movement along a first rotational axis for changing a tilt angle of the guiding elements in relation to the first rotational axis, (b) a height adjustment movement for determining a height of the support unit, and (c) an advance movement for advancing the support unit towards the solar panel device.

3. The robotic system according to claim 2 wherein the alignment unit comprises a rotating mechanism for performing the rotational movement, wherein the rotating mechanism is configured to facilitate a solar panel device induced movement of the support unit.

4. The robotic system according to claim 2 wherein the alignment unit comprises a rotating mechanism for performing the rotational movement along a tilt angular range that spans between at least forty five degrees to minus forty five degrees in relation to a horizon.

5. The robotic system according to claim 2 wherein the alignment unit is configured to align the first rotational axis with a rotational axis of the solar panel device, when the solar panel device is a tracking solar panel device that has a rotational axis.

6. The robotic system according to claim 2 wherein the first guiding element and the second guiding element are positioned within a virtual plane.

7. The robotic system according to claim 6 wherein the first rotational axis is located below the virtual plane.

8. The robotic system according to claim 6 wherein each sensing unit of the first sensing unit and the second sensing unit comprises a first inclination sensor and a first interfacing element that extends from the sensing unit toward the solar panel device, wherein the first inclination sensor is configured to sense an inclination of the first interfacing element along a second axis that is oriented to the virtual plane, wherein the first inclination sensor is analog and is not a visual sensor.

9. The robotic system according to claim 8 wherein each sensing unit comprises a second inclination sensor and a second interfacing element that extends from the sensing unit towards the solar panel device, wherein the second inclination sensor is configured to sense an inclination of the second interfacing element along a third axis that is oriented to the second axis.

10. The robotic system according to claim 9 wherein the first inclination sensor is a bar and the second interfacing element comprises a wheel that is mechanically coupled to an arm.

11. The robotic system according to claim 9 wherein each sensing unit comprises a proximity sensor for sensing a presence of the solar panel device within a proximity of the proximity sensor.

12. The robotic system according to claim 2 wherein the alignment unit is configured to:
  a. position the robotic system in an initial position in which the first guiding element and the second guiding element are below and are positioned to the side of a surface of the solar panel device;
  b. elevate the first guiding element and the second guiding element and position the first guiding element and the second guiding element within a virtual plane that is substantially parallel to the surface and above the surface; and
  c. move the first guiding element and the second guiding element from the side of the surface towards the surface, and lower the first guiding element and the second guiding element to reach alignment.

13. The robotic system according to claim 1 wherein the first guiding element comprises a first bar that has a first exterior part and a first internal part, the second guiding element comprises and second bar that has a second exterior part and a second internal part.

14. The robotic system according to claim 13 wherein a distance between the first exterior part and the second exterior part substantially equals a width of the solar panel device.

15. The robotic system according to claim 13 wherein a distance between the first exterior part and the second exterior part substantially equals a width of the solar panel device.

16. The robotic system according to claim 1 wherein the control unit is configured to determine that the solar panel device is moving during the alignment process.

17. The robotic system according to claim 16 wherein the control unit is configured to stop the alignment process and cause the drive unit to move the robotic system from the solar panel device following the determination that the solar panel device is moving during the alignment process.

18. The robotic system according to claim 1 wherein the control unit is configured to request the surface cleaning device to move towards the solar panel device and to mount on the solar panel device when the first guiding element and the second guiding element are aligned with the solar panel device.

19. The robotic system according to claim 1 wherein each guiding element of the first guiding element and the second guiding element has a first side and a second side, and is configured to guide the surface cleaning device to move between the first side to the second side.

20. The robotic system according to claim 1 wherein the robotic system is shaped and sized to (a) move along a gap formed between a first column of solar panel devices, and a second column of solar panel devices, and (b) supply the surface cleaning device to a solar panel device of either one of the first column and the second column while being positioned at the gap.

21. The robotic system according to claim 1 comprising at least one limiting element for limiting a movement between the solar panel device and the support unit.

22. The robotic system according to claim 21 wherein each of the at least one limiting element is configured to limit the movement only until a predefined force is applied by the solar panel device on the at least one limiting element.

23. The robotic system according to claim 1 comprising at least one limiting element comprises at least one first limiting element that extends from the first sensing unit and at least one second limiting element that extends from the second sensing unit.

24. The robotic system according to claim 1 wherein the drive unit has a rail interface for guiding the robotic system to move along a rail.

\* \* \* \* \*